(12) United States Patent
Liao et al.

(10) Patent No.: US 8,348,060 B2
(45) Date of Patent: Jan. 8, 2013

(54) AIR ENCLOSURE WITH SIDE CUSHIONING FUNCTION

(75) Inventors: Chian Hua Liao, New Taipei (TW); Yao Sin Liao, New Taipei (TW); Bo Xin Jian, New Taipei (TW)

(73) Assignee: Yao Sin Liao, New Taipei (TW)

( * ) Notice: Subject to any disclaimer, the term of this patent is extended or adjusted under 35 U.S.C. 154(b) by 0 days.

(21) Appl. No.: 13/342,537

(22) Filed: Jan. 3, 2012

(65) Prior Publication Data

US 2012/0097568 A1   Apr. 26, 2012

Related U.S. Application Data

(63) Continuation-in-part of application No. 11/742,914, filed on May 1, 2007, now abandoned.

(30) Foreign Application Priority Data

Aug. 15, 2006  (TW) ................................ 95129944 A

(51) Int. Cl.
*B65D 81/02* (2006.01)
(52) U.S. Cl. ................................ 206/522; 428/71; 383/3
(58) Field of Classification Search .................. 206/522, 206/521; 383/3, 38, 39, 40; 156/292, 361; 428/35.7
See application file for complete search history.

(56) References Cited

U.S. PATENT DOCUMENTS

| | | | |
|---|---|---|---|
| 5,340,632 A | 8/1994 | Chappuis | |
| 7,631,762 B2* | 12/2009 | Liao et al. .................... | 206/522 |
| 2004/0265523 A1 | 12/2004 | Koyanagi et al. | |
| 2007/0295633 A1 | 12/2007 | Liao et al. | |
| 2008/0159659 A1* | 7/2008 | Liao et al. .................... | 383/3 |

FOREIGN PATENT DOCUMENTS

| | | |
|---|---|---|
| DE | 4427912 | 2/1996 |
| DE | 19818217 | 10/1999 |
| DE | 202004006032 | 9/2004 |
| DE | 102006001730 | 7/2007 |
| EP | 1189343 | 3/2002 |
| JP | 05-016671 | 3/1993 |
| JP | 08-034478 | 2/1996 |
| JP | 2003072851 | 3/2003 |
| KR | 0390052 | 7/2005 |

* cited by examiner

*Primary Examiner* — David T. Fidei
*Assistant Examiner* — Raven Collins
(74) *Attorney, Agent, or Firm* — Rabin & Berdo, P.C.

(57) ABSTRACT

An air enclosure is provided. An air filling passageway for filling air into the first and second air cylinders is formed between two inner films. A plurality of first air cylinders and at least one second air cylinder are formed between two outer films. The second air cylinder includes an upper section, a middle section, and a lower section. The upper section, middle section, and lower section are isolated from each other. At least one tiny tube, connected with the upper and lower section is disposed at the middle section. The air is filled into the first air cylinders, as well as the upper section and the lower section, while the middle section remains flat. Because second air cylinder includes expanded upper section, lower section, and flat middle section, an accepting space with different shapes can be formed.

6 Claims, 10 Drawing Sheets

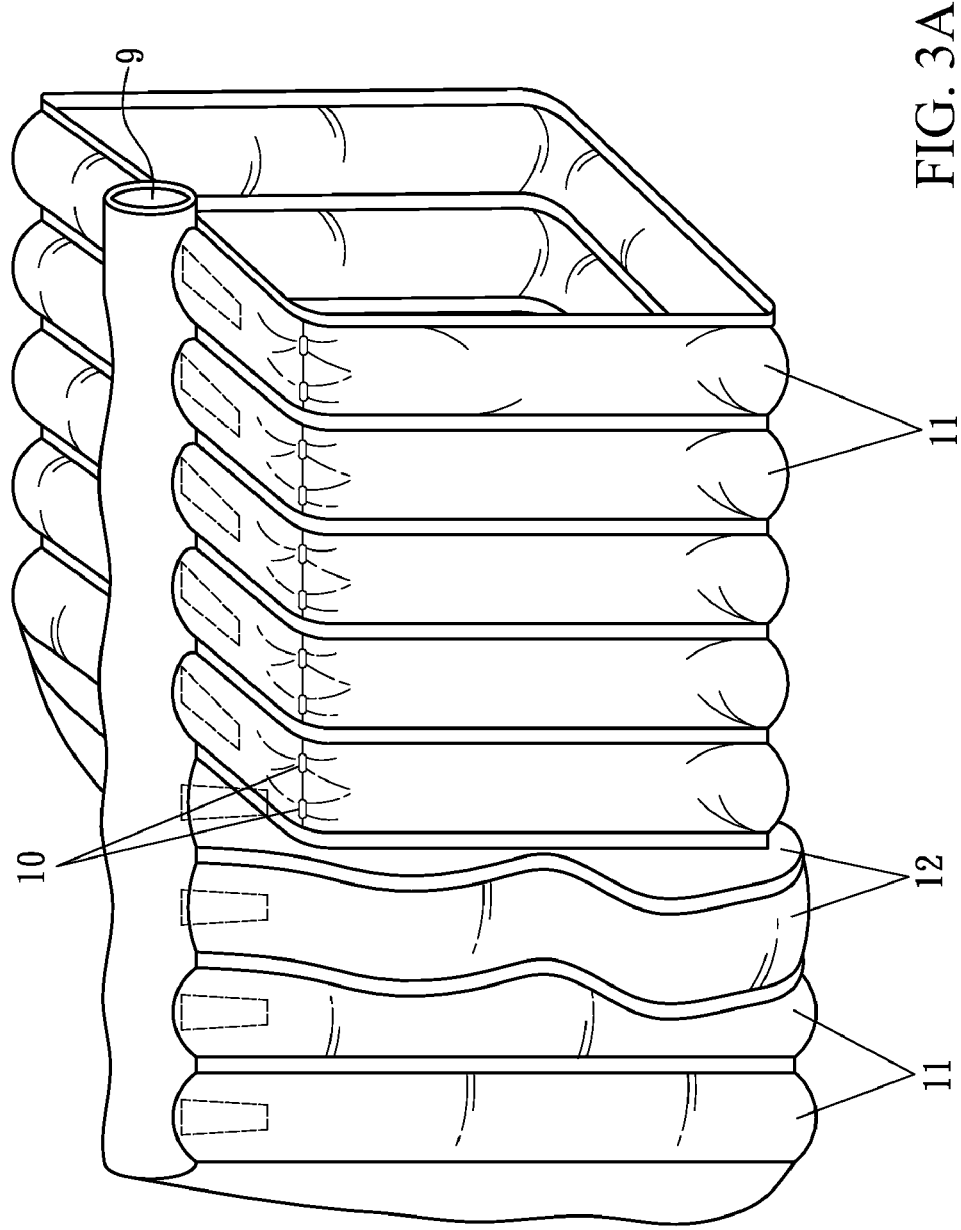

AIR ENCLOSURE WITH SIDE CUSHIONING FUNCTION

CROSS-REFERENCES TO RELATED APPLICATIONS

The present application is a continuation-in-part application of U.S. patent application Ser. No. 11/742,914, filed on May 1, 2007, which claimed the priority of Taiwan Application No. 95129944, filed on Aug. 15, 2006.

FIELD OF INVENTION

The present invention relates to an air enclosure, and more particularly to an air enclosure with a side cushioning function.

BACKGROUND

A conventional way for packing an article with a cushioning agent mostly is wrapping around the article with a plastic sheet on which a plurality of small raised air bags are projected to attain to the shock-absorbed cushioning functions. But the shock absorption capability of the small air bags is limited such that the cushioning and the shock absorption effects to a larger shock or impulse cannot be attained.

Therefore, an air packing bag made from a resin material is developed. Please refer to FIGS. 1A to 1D. An air inlet A11 is disposed on one side of a packing bag A10 and an air entering passageway A12 is connected to the air inlet A11, in which the air entering passageway A12 has air routes respectively communicated with each air chamber A13 and is disposed with an air valve A14 constituted by a upper air valve film and a lower air valve film. After air in the air inlet A11 is filled into each air chamber A13 via the air entering passageway A12, the air packing bag A10 can then be filled with air to expand and used as a cushioning means. For example, Taiwan Utility Patent No. M262680 proposes an air packing bag with a reverse air locking sheet capable of being used for wrapping a flat type article; if a type of the article is irregular or a breadth of a product is slightly different, a different air packing bag must then be used to process packing. Furthermore, Chinese Patent Publishing No. CN1620392A proposes a thin plastic film made bag with an air cushioning effect; the side protection is not good and the wrapping is difficult when it is used for packing a square or an irregular polygonal type article. Furthermore, Chinese Utility Patent No. 2004200870092 discloses a double side enforced type air cushioning bag; a shape of the bag is fixed and without any elasticity while being used such that it is only adapted to pack a flat article and unable to warp a square article. Moreover, each packing bag must be conform to a size of a packed-to-be article, otherwise it cannot be used; namely, it is not a multipurpose bag.

SUMMARY

For improving a structure of an air packing bag to allow it to wrap a different size or dimension of article and provide a side cushioning protection effect, the present invention is proposed.

The present invention proposes an air enclosure with a side cushioning function. It comprises two outer films stacked together vertically and two inner films disposed between the outer films. Hot sealing is used to allow an air filling passageway to be formed between the inner films. A plurality of first air cylinders and at least one second air cylinder are formed between the outer films. The inner films are adhered by means of hot sealing to form an air entering passageways used for communicating the air filling passageway with the first air cylinders and the second cylinder. The second cylinder includes upper section, middle section, and lower section. Upper section, middle section, and lower section are isolated from each other. At least one tiny tube is disposed at middle section of second air cylinder. Tiny tube is connected with upper section and lower section of second air cylinder. Hence, the gas(air) is able to be filled into the upper section and the lower section of second air cylinder, while the middle section maintains flat. The air is filled into the first air cylinders and the upper section and the lower section of the second cylinder, the middle section of the second air cylinders maintain flat.

The present invention also proposes an air enclosure with a side cushioning function. It includes two outer film stacked together vertically and an inner film disposed between the outer films. Hot sealing means is used to allow an air filling passageway to be formed between the inner film and one of the outer films. A plurality of first air cylinders and at least one second air cylinder are formed between the outer films. The inner films are adhered to one of the outer films by means of hot sealing to form an air entering passageways used for communicating the air filling passageway with the first air cylinders and the second air cylinder. The second cylinder includes upper section, middle section, and lower section. Upper section, middle section, and lower section are isolated from each other. At least one tiny tube is disposed at middle section of second air cylinder. Tiny tube is connected with upper section and lower section of second air cylinder. Hence, the gas(air) is able to be filled into the upper section and the lower section of second air cylinder, while the middle section maintains flat. The air is filled into the first air cylinders and the upper section and the lower section of the second cylinder, the middle section of the second air cylinders maintain flat.

Because second air cylinder includes expanded upper section, lower section, and flat middle section, an accepting space with different shapes can be formed.

BRIEF DESCRIPTION OF THE DRAWINGS

The present invention can be more fully understood by reference to the following description and accompanying drawings, in which:

FIG. 3A is a schematic view, showing a double sheet wall-attached type air enclosure after being filled with air in one situation;

DETAILED DESCRIPTION

Figure 1A:
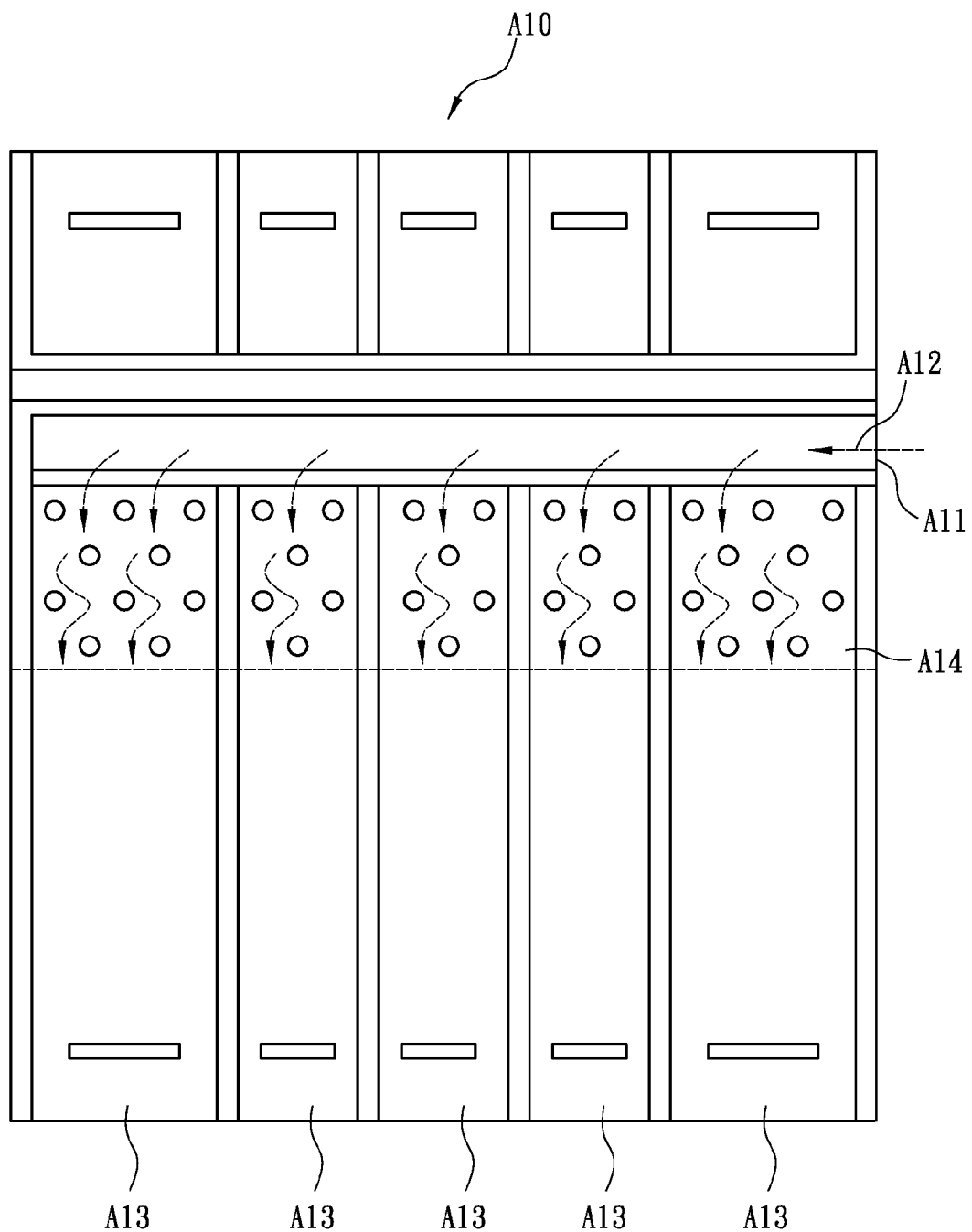
FIG. 1A is a schematic view of a conventional air packing bag before being filled with air.
Figure 1B:
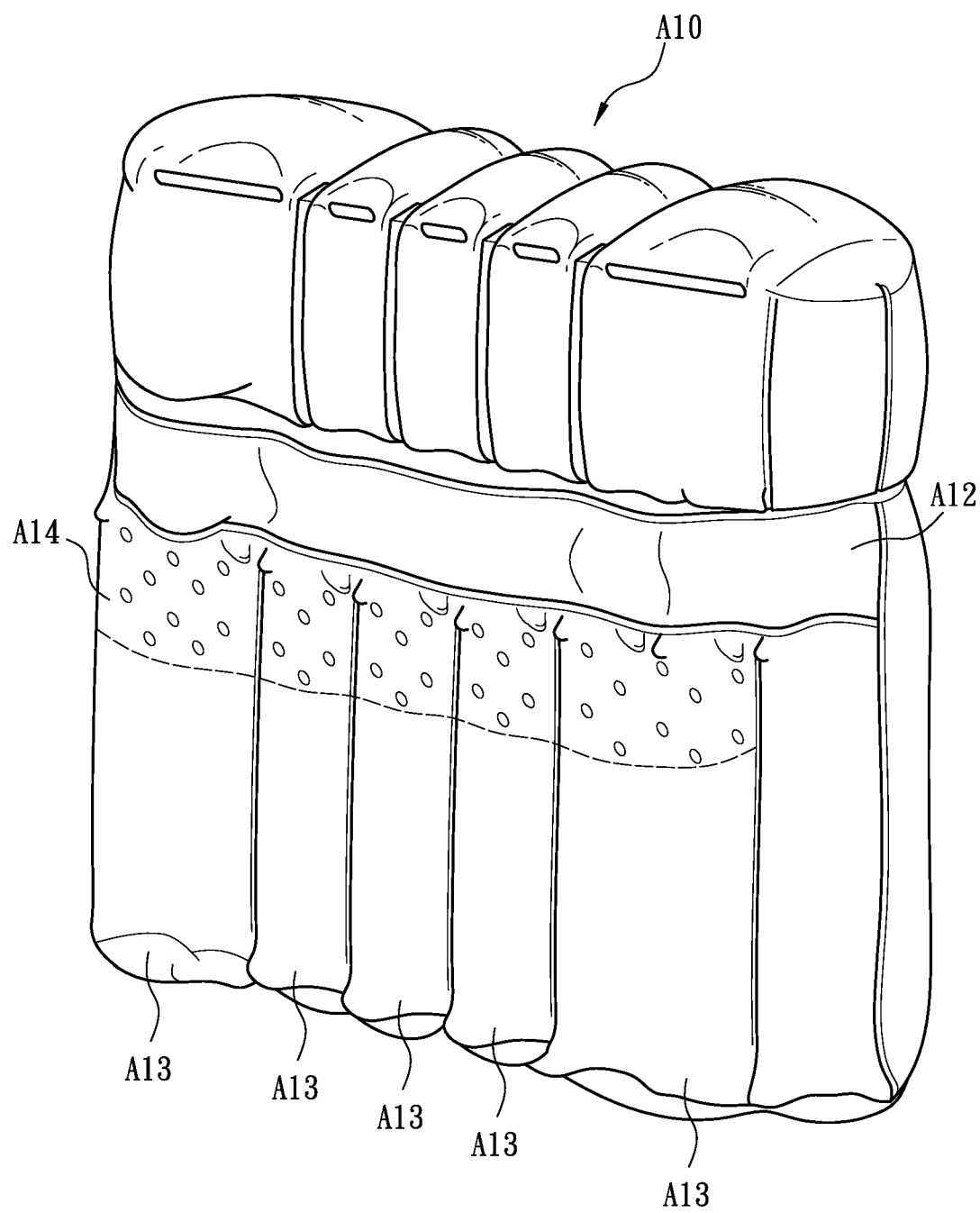
FIG. 1B is a schematic view of a conventional air packing bag after being filled with air.
Figure 1C:
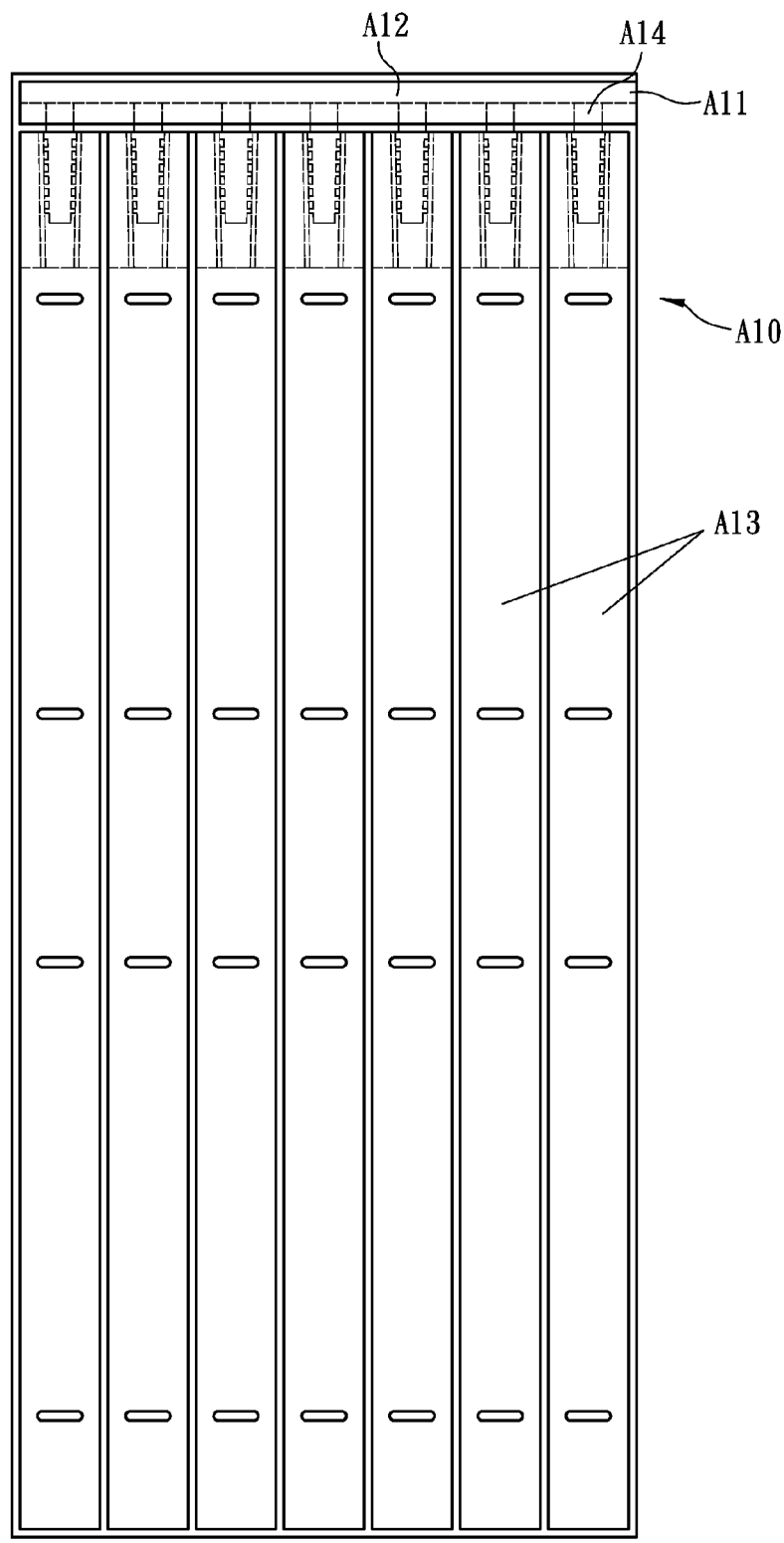
FIG. 1C is a schematic view of a conventional air packing bag before being filled with air.
Figure 1D:
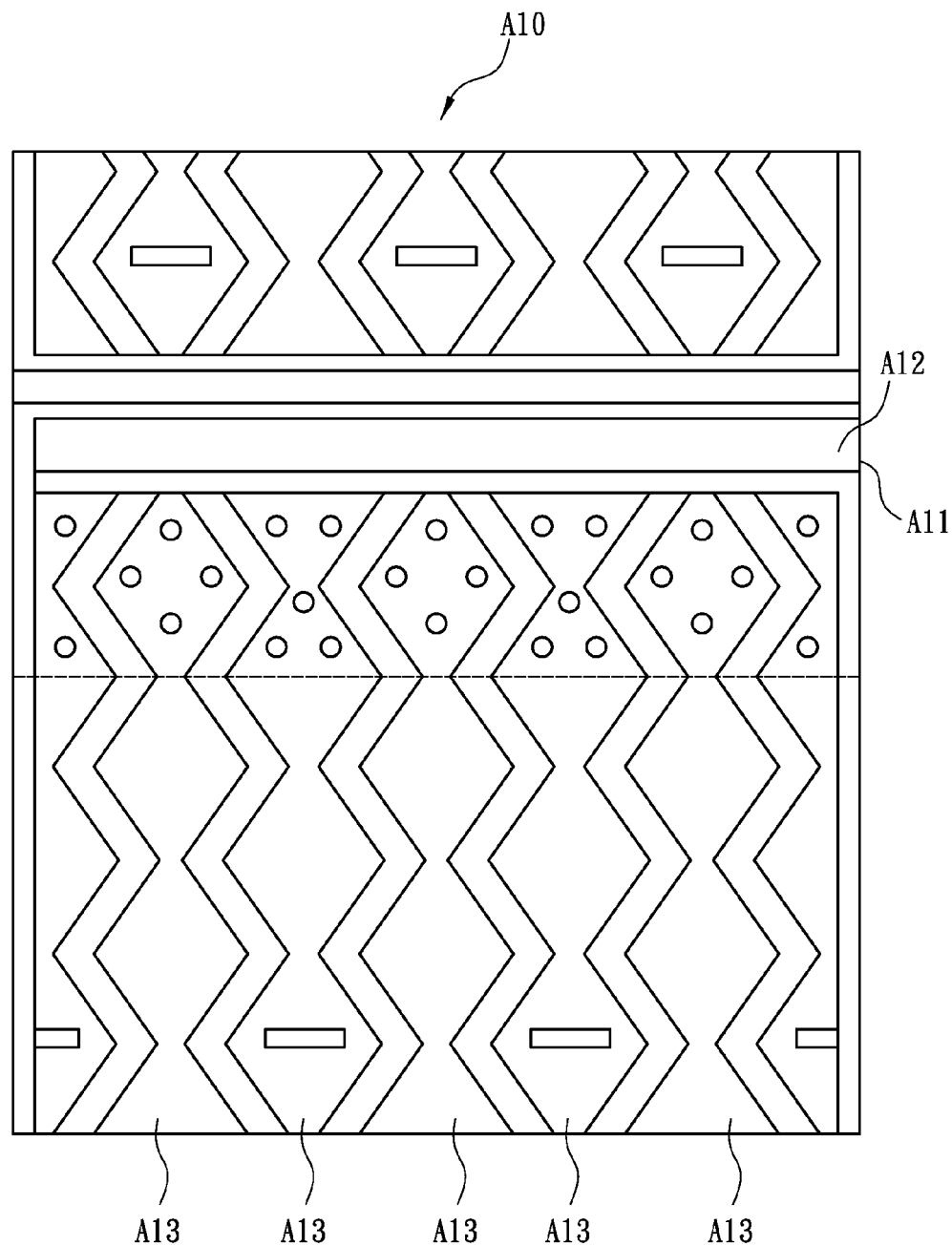
FIG. 1D is a schematic view of a conventional air packing bag before being filled with air.
Figure 2A:
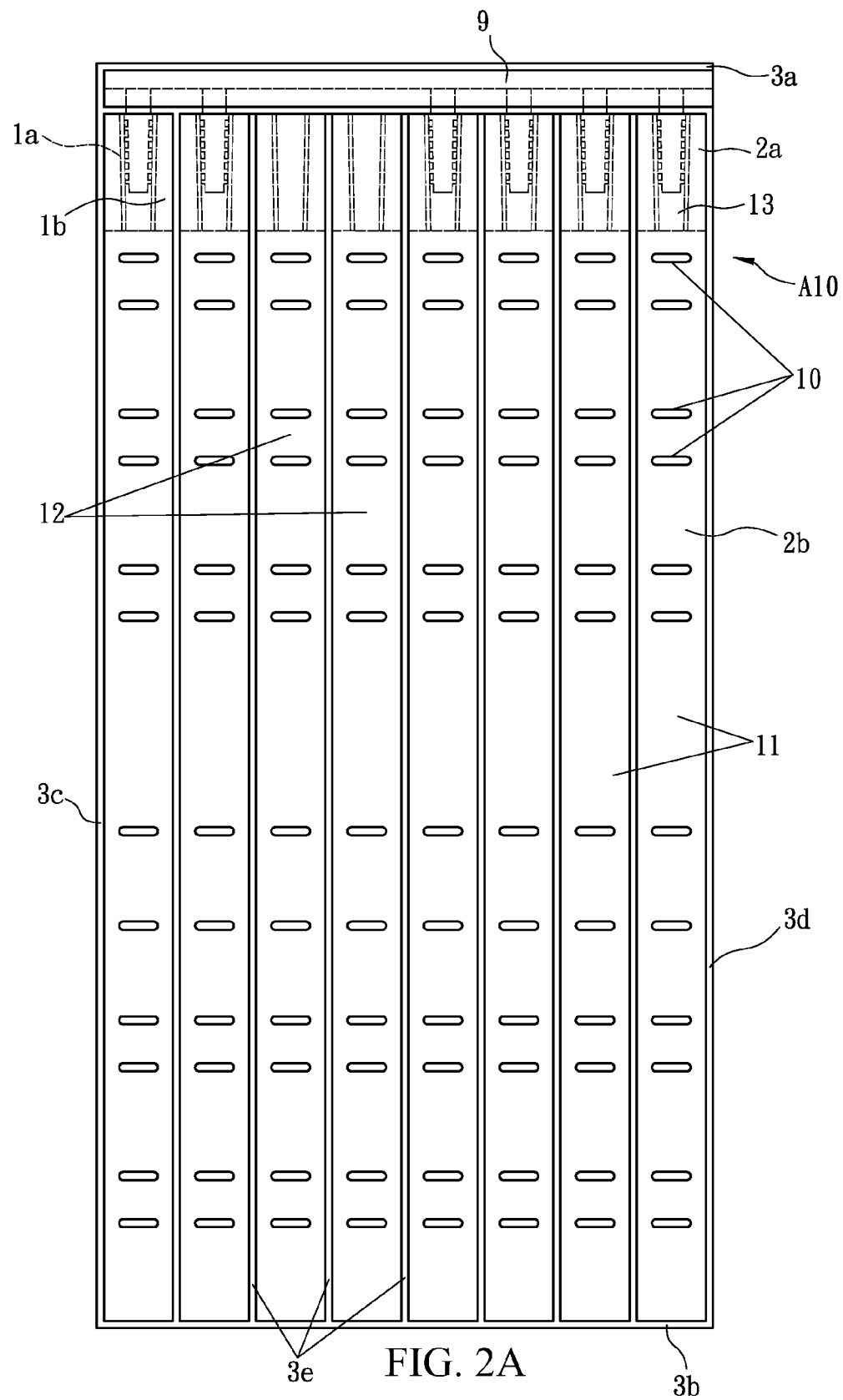
FIG. 2A is a plane view, showing a double sheet wall-attached type air enclosure before being filled with air of a preferred embodiment according to the present invention.
Figure 2B:
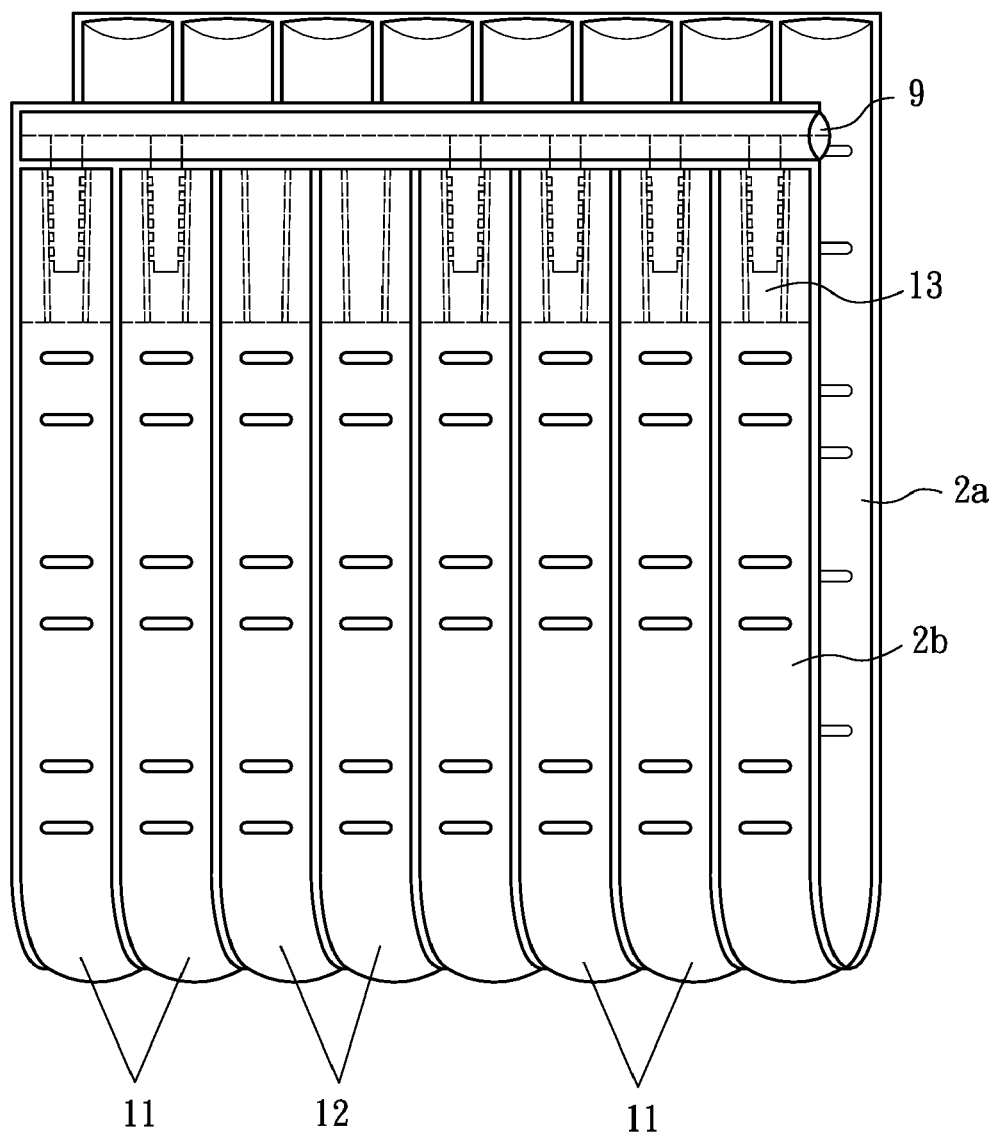
FIG. 2B is a schematic view, showing rigging processing of an air enclosure shown in FIG. 2A.

Please refer to FIGS. 2A and 2B. FIG. 2A is a plane view showing a double sheet wall-attached type air enclosure before being filled with air of a preferred embodiment according to the present invention and FIG. 2B is a schematic view showing rigging processing of an air enclosure shown in FIG. 2A.

An air enclosure with a side cushioning function comprises two outer films 2a and 2b, two inner films 1a and 1b, a plurality of first air cylinders 11, at least one second air cylinder 12 and a plurality of air entering passageways 13.

Both outer films 2a and 2b are stacked together vertically.

Both inner films 1a and 1b are attached on one side of the outer film 2a or 2b, and a heat resistant material 1c is spread between the inner films 1a and 1b so as to use the heat resistant material 1c as a passageway capable of allowing air to flow.

Hot sealing is processed along hot sealing lines 3a, 3b, 3c, 3d and 3e so as to adhere the outer films 2a and 2b and the inner films 1a and 1b together to allow the air filling passageway 9 to be formed between the outer films 1a and 1b. The air filling passageway 9 is passed through the hot sealing lines 3e and hot sealing can be a hot mold pressing.

After hot sealing is processed, a plurality of first air cylinders 11 capable of storing air and a plurality of second air cylinders 12 at one side of first air cylinders 11 are allowed to form between the outer films 2a and 2b. Furthermore, one side of second air cylinders 12 can be connected with first air cylinder 11 or two sides thereof can respectively be connected with first air cylinders 11.

A plurality of nodes 10 are formed on each first air cylinder 11 by means of hot sealing, second air cylinders 12 can then be bended along the nodes 10. Disposition positions of the nodes 10 can be decided depending on an outlook of a packed-to-be article when hot sealing is processed so as to accept every kind of different article.

A heat resistant material is spread sequentially and separately between the inner films 1a and 1b, for example, heat resistant resin or ink is printed to allow the inner films 1a and 1b not to be adhered to each other to form the air entering passageways 13 even after hot sealing is processed. Accordingly, parts of air entering passageways 13 are closed by means of hot sealing to allow air in the air filling passageway 9 not to enter second air cylinders 12 to enable second air cylinders 12 not to be filled with air.

Furthermore, rigging is processed on first air cylinders 11 and second air cylinders 12 and a upper side and any one longitudinal side thereof are adhered by means of hot sealing to allow first air cylinders 11 and second air cylinders 12 to form an accepting space for accepting an article after being rigged.

Figure 3B:
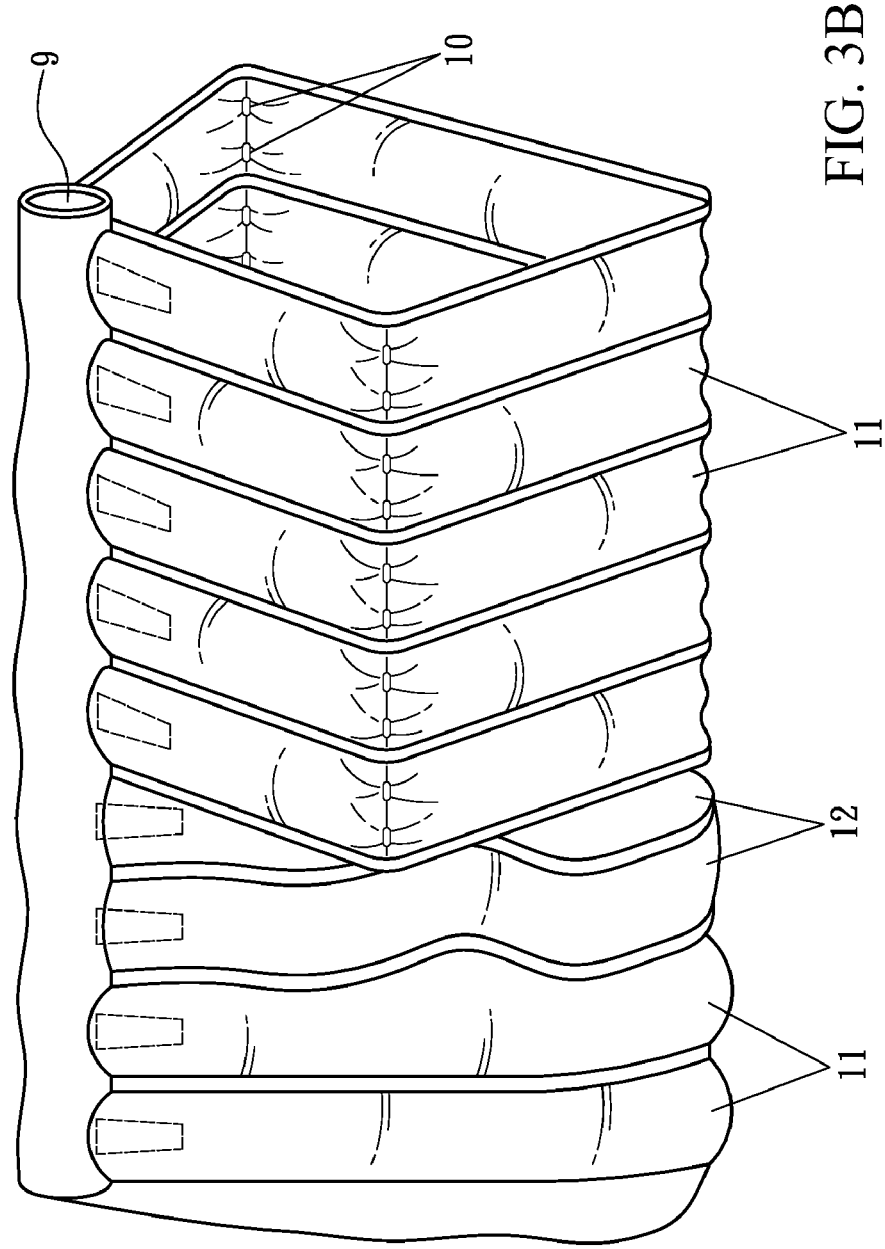
FIG. 3B is a schematic view, showing a double sheet wall-attached type air enclosure after being filled with air in another situation.

Please refer to FIGS. 3A and 3B. FIG. 3A is a schematic view showing a double sheet wall-attached type air enclosure after being filled with air in one situation and FIG. 3B is a schematic view showing a double sheet wall-attached type air enclosure after being filled with air in another situation.

Air entering the air filling passageway 9 allows the inner films 1a and 1b to be pulled apart outward so as to use the air in the air filling passageway 9 to fill first air cylinders 11 with air to cause first air cylinders 11 to be filled with air and expanded. Inner air pressure in each first air cylinder 11 presses the inner films 1a and 1b to attach closely onto the outer films 2a or 2b to cover the air entering passageway 13 to shield first air cylinder 11 to allow air not to be leaked out and attain to the air sealing effect. But, second air cylinders 12 still maintain flat such that a fall of level is generated between it and second air cylinder 12 after first air cylinder 11 is caused to fill with air and expand.

First air cylinders 11 are bended along the nodes 10 to cause it to conform to an outlook of a packed-to-be article so as to be able to accept a cubic or irregular polygonal article. Thereafter, it is then bended along second air cylinders 12 to cause a position of first air cylinder 11 adjacent to second air cylinders 12 to be changed to form a side protection air cylinder so as to provide the side cushioning function for the wrapped article.

However, second air cylinders 12 still maintain flat to become a connection section between the expanded first air cylinders 11. Because the air cylinders are made from resin, the unfilled air cylinders form a flexible area. A distance between second air cylinder 12 and first air cylinder 11 adjacent thereto is extended by pulling second air cylinder 12. Hence the accepting space of the air enclosure can then be enlarged to accept a larger article or shrunk to accept a smaller article. Therefore, the object of wrapping different sizes and dimensions of articles is accomplished.

Figure 4A:
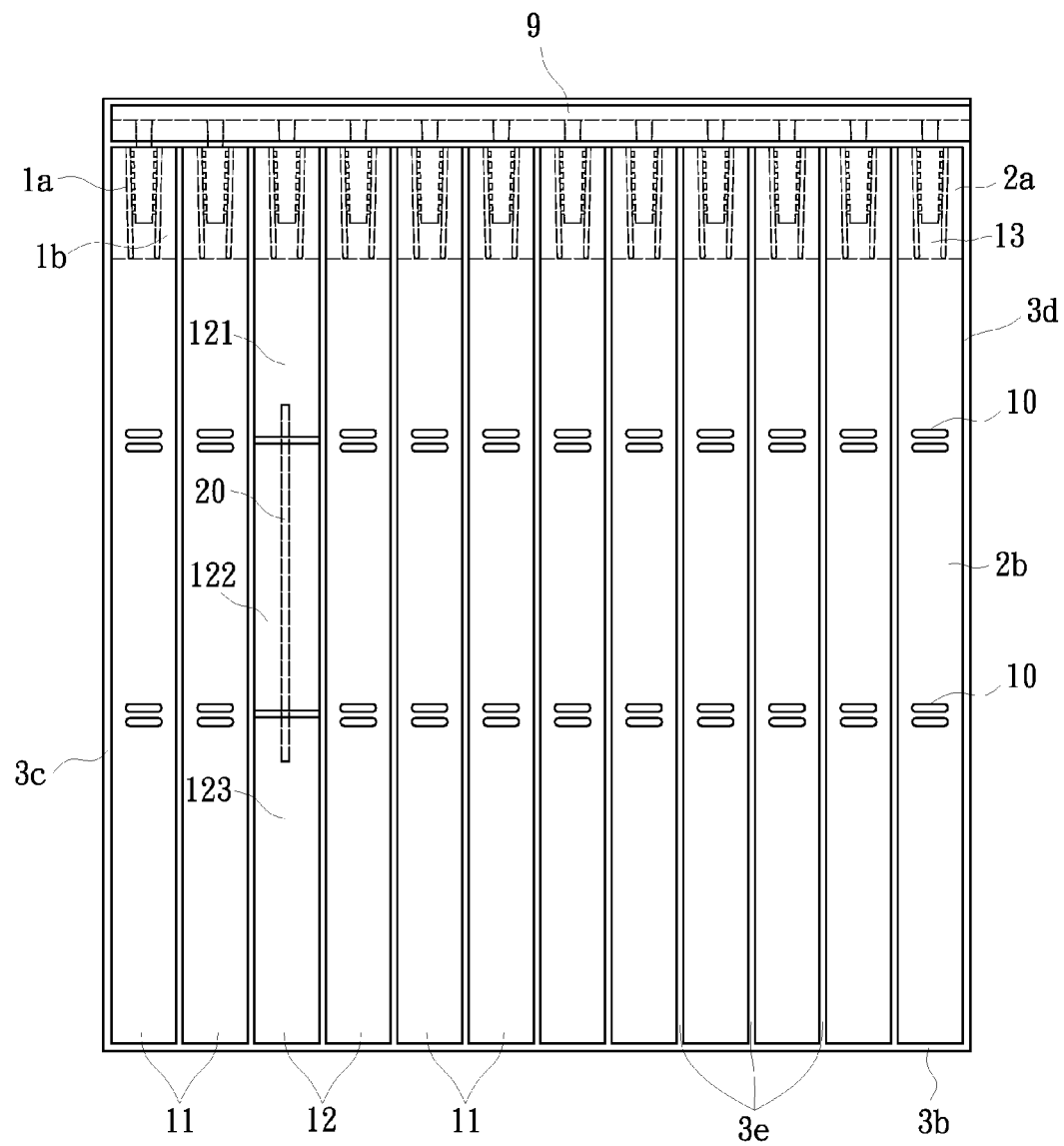
FIG. 4A is a schematic view, showing a double sheet wall-attached type air enclosure with one tiny tubes disposed inside.
Figure 4B:
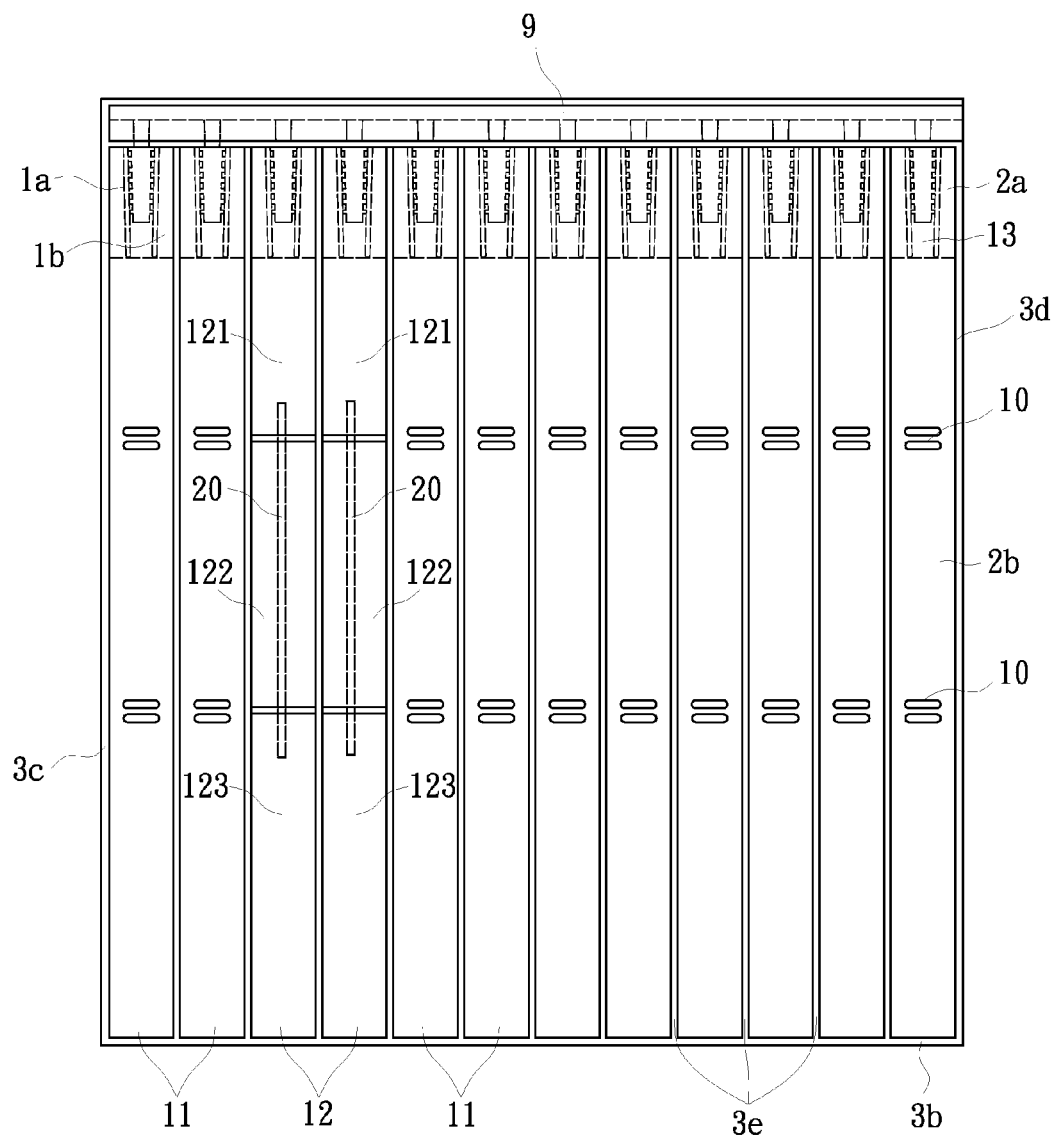
FIG. 4B is a schematic view, showing a double sheet wall-attached type air enclosure with two tiny tubes disposed inside.

Please refer to FIGS. 4A and 4B, respectively showing a double sheet wall-attached type air enclosure with one and two tiny tubes disposed inside. In one embodiment of the present invention, second cylinder 12 includes upper section 121, middle section 122, and lower section 123. Upper section 121, middle section 122 and lower section 123 are isolated from each other. At least one tiny tube 20 is disposed at middle section 122 of second air cylinder 12. Tiny tube 20 is connected with upper section 121 and lower section 123 of second air cylinder 12. Hence, the gas(air) is able to be filled into the upper section 121 and the lower section 123 of second air cylinders 12, while the middle section 122 maintains flat. Because second air cylinder 12 includes expanded upper section 121, lower section 123, and flat middle section 122, an accepting space with different shapes can be formed.

The air enclosure according to the present invention can be designed to be a double sheet wall-attached type, double sheet wall-hanged type or single sheet wall-attached type. If it is the single sheet wall-attached type, the air filling passageway 9 is a space formed by adhering the inner film 1a to the outer film 2a by means of hot sealing, the air entering passageways 13 are formed by adhering the inner film 1a to the outer film 2a by means of hot sealing, other structures thereof are the same as the double sheet wall-attached type air enclosure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air enclosure with a side cushioning function, comprising:
    two outer films, stacked together vertically;
    two inner films, disposed between the outer films;
    an air filling passageway formed between the inner films by adhering the inner films to each other by hot sealing;
    a plurality of first air cylinders disposed at one end of the air filling passageway and respectively being formed between the outer films by adhering the outer films to each other by hot sealing;

at least one second air cylinder, disposed at the one end of the air filling passageway and formed by adhering the outer films to each other by hot sealing, the second air cylinder including an upper section, a middle section and a lower section that are isolated from one another;

at least one tiny tube disposed at the middle section of the second air cylinder the tiny tube being connected with the upper section and the lower section of the second air cylinder; and at least one air entering passageway in communication with the air filling passageway and the first air cylinder and being formed by adhering the inner films to each other by means of hot sealing, wherein, the first air cylinders, and the upper and lower sections of the second cylinder, are configured to lock air inflated therein, and the middle section of the second air cylinder is not inflatable.

2. The air enclosure according to claim 1, wherein the first air cylinder has at least one node, and the first air cylinder is bendable along the node.

3. The air enclosure according to claim 2, wherein the second air cylinder is disposed between two of the plurality of first air cylinders.

4. An air enclosure with a side cushioning function, comprising:

two outer films, stacked together vertically;

two inner films, disposed between the outer films;

an air filling passageway formed between one of the inner films and one of the outer films by adhering the one inner film to the one outer film by hot sealing;

a plurality of first air cylinders disposed at one end of the air filling passageway and respectively being formed between the outer films by adhering the outer films to each other by hot sealing;

at least one second air cylinder, disposed at one the end of the air filling passageway and formed by adhering the outer films to each other by hot sealing, the second air cylinder including an upper section, a middle section and a lower section that are isolated from one another;

at least one tiny tube disposed at the middle section of the second air cylinder, the tiny tube being connected with the upper section and the lower section of the second air cylinder; and at least one air entering passageway in communication with the air filling passageway and the first air cylinder and being formed by adhering the inner film to one of the outer films by hot sealing, wherein, the first air cylinders, and the upper and lower sections of the second cylinder, are configured to lock air inflated therein, and the middle section of the second air cylinder is not inflatable.

5. The air enclosure according to claim 4, wherein the first air cylinder has at least one node, and the first air cylinder is bendable along the node.

6. The air enclosure according to claim 5, wherein the second air cylinder is disposed between two of the plurality of first air cylinders.

* * * * *